Dec. 25, 1934.   T. A. BRYSON   1,985,312
METHOD OF AND APPARATUS FOR CONTROLLING A CHARACTERISTIC OF A MATERIAL
Filed Oct. 23, 1931   2 Sheets-Sheet 2
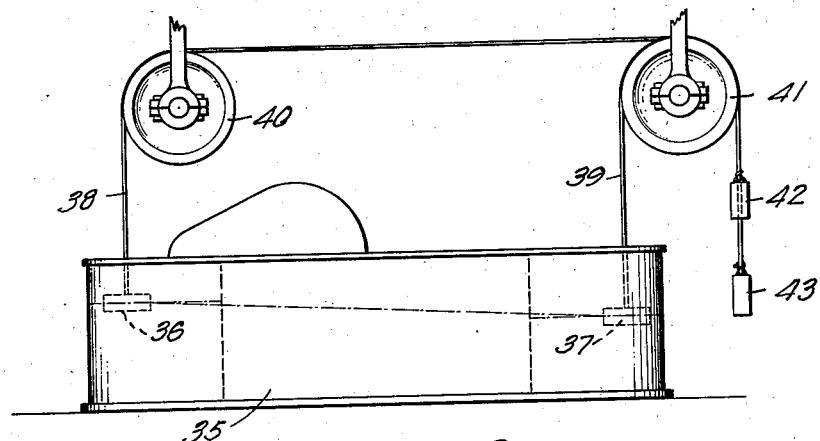
FIG. 2
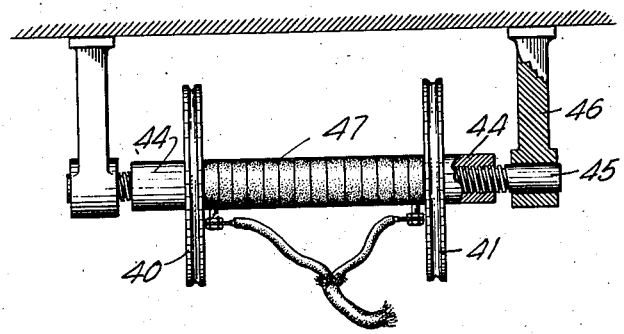
FIG. 3
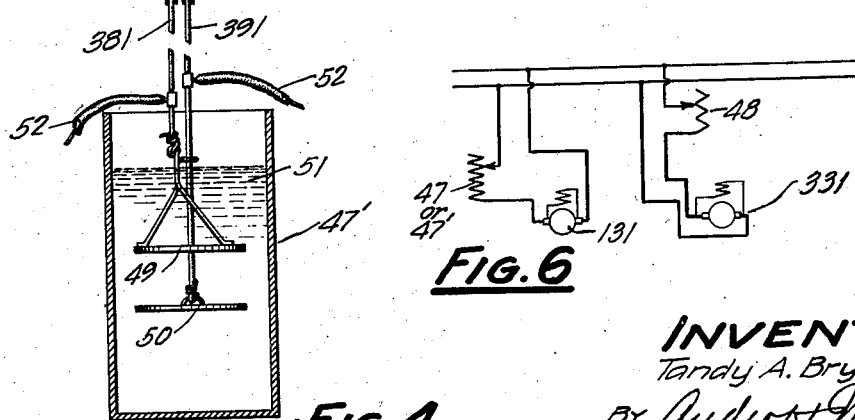
FIG. 4
FIG. 6
INVENTOR
Tandy A. Bryson
BY
ATTORNEYS Patented Dec. 25, 1934

1,985,312

UNITED STATES PATENT OFFICE 1,985,312

METHOD OF AND APPARATUS FOR CONTROLLING A CHARACTERISTIC OF A MATERIAL

Tandy A. Bryson, Troy, N. Y.

Application October 23, 1931, Serial No. 570,725

18 Claims. (Cl. 92—46)

My invention relates to a method and apparatus for controlling such characteristics of a fluent or plastic material as its consistency, turbidity, acidity, alkalinity, viscosity, plasticity, density, color, or in fact any characteristic the variations in which are readily measurable either directly as such or, indirectly by their effect on a characteristic which is readily measurable. For example, the regulation and control of the consistency of a mixture may involve, as one step, a direct measure of the consistency because this can readily be done. On the other hand, the regulation and control of the acidity of a mixture may involve as one step, the indirect determination of the acidity by measuring the viscosity, color or any other characteristic which is affected by or varies with the acidity.

Broadly, my invention contemplates first, the use of any appropriate means for continually measuring or determining the particular characteristic to be controlled, the variations in which will be utilized to effect variations, from a predetermined standard, in the speed of a moving element. Second, it contemplates the use of appropriate means for quickly detecting variations in speed of the moving element as effected by variations in the characteristic to be controlled, and the direct utilization of this speed-variation-detecting-means for controlling additions to or withdrawals from the material.

In its preferred embodiment, the means contemplated by my invention for controlling a characteristic of a material includes only three moving elements; one of which moves at a rate of speed which is dependent upon the characteristic to be controlled and varies therewith; one of which moves at a substantially constant predetermined speed and which said speed is or may be the same speed at which the first element moves when the characteristic conforms to a prescribed standard; and one of which moves responsive to differences in speed of the first two elements mentioned and may be used to effect a direct control of the characteristic. For convenience, the movement of each of these elements is preferably one of rotation.

One of the objects of my invention is to provide a means and method for controlling a characteristic of a fluent or plastic material which will be extremely sensitive in its operation whereby a fairly uniform rather than average regulation is attained. Another object is to provide a device of the character described in which variations of the characteristic to be controlled will be immediately reflected in the operation of means for applying a corrective, and in which the degree or extent of application of the corrective will be directly proportional to the degree or extent of the variation of the characteristic from a prescribed standard. Another object is to provide a novel means extremely sensitive to variations in the controlled characteristic for directly applying a corrective thereto. A further object is to provide a characteristic controlling means which may be used in combination with substantially any means employed or adapted for measuring or determining the characteristic to be controlled.

With these and other objects in view which will be apparent from a reading of the specification, my invention includes the novel elements and the combination and arrangements thereof described below and illustrated in the accompanying drawings showing the application thereof in the paper making art to controlling the consistency of paper stock. It is, of course, understood that my invention is in no sense limited thereto.

Fig. 2 is a side view illustrating diagrammatically a modified form of certain elements of my invention;

Fig. 3 is a detail view of a differential mechanism actuated by the respective floats in Fig. 2 for varying an electric current in accordance with variations in the consistency of the material;

Fig. 4 illustrates a modified form of rheostat operated by the floats in Fig. 2;

Fig. 5 is a diagram of connections for Fig. 1;

Fig. 6 is a diagram of connections for the arrangement illustrated in Figs. 2, 3, 4 and 7, and Fig. 7 is a fragmentary plan view of a modified form of my invention.

Like reference characters indicate like parts throughout the drawings.

Figure 1:
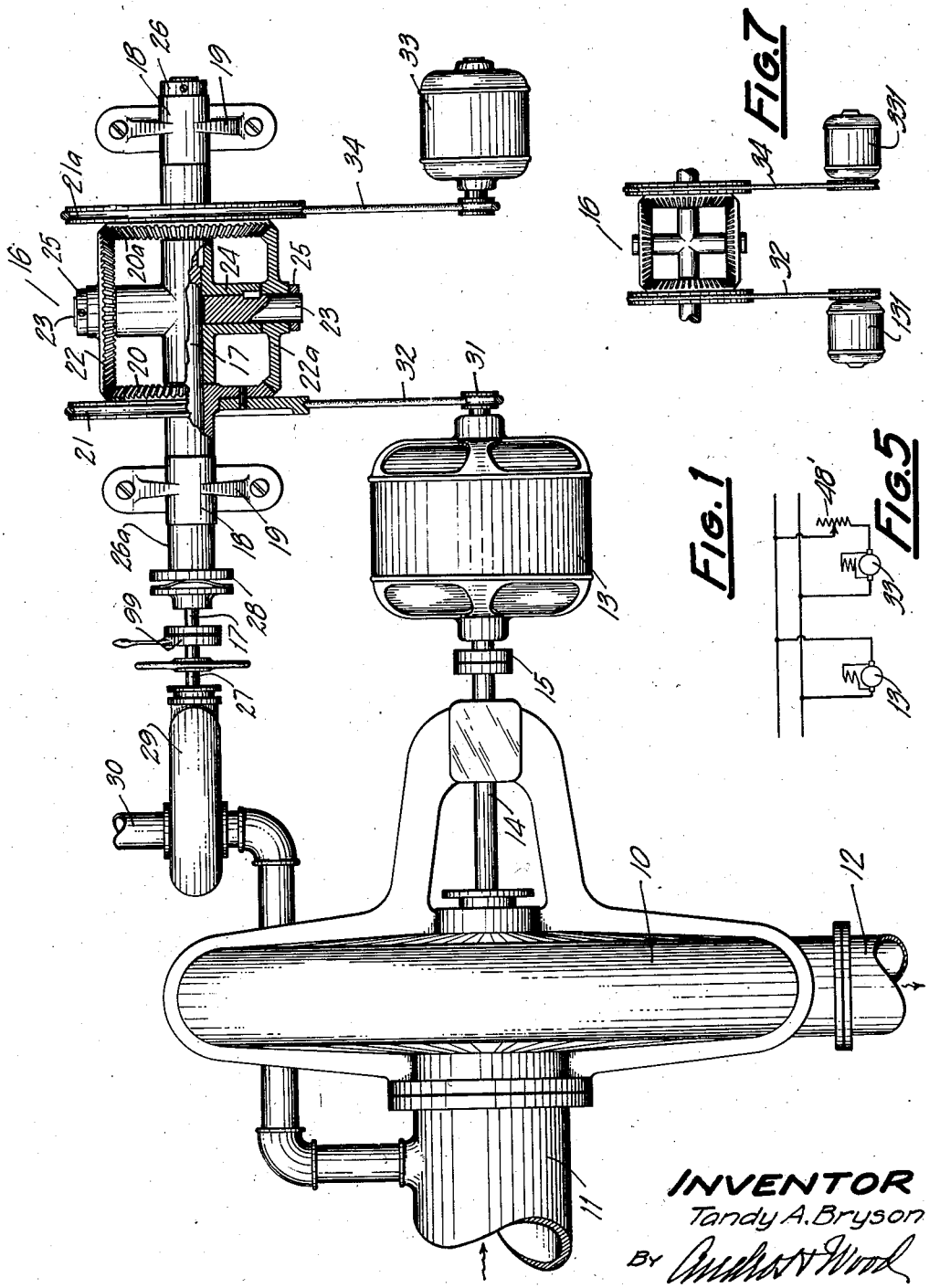
Fig. 1 is a plan view of a device embodying one form of my invention.

One embodiment of my invention in which variations in the characteristic to be controlled are reflected in the speed variations of a pump rotor or other element moving in the material is illustrated in Fig. 1. Here, 10 is the pump which, for the purpose of exemplifying my invention, may be assumed to be any pump regularly employed in a paper mill for forcing paper stock from a supply pipe 11 to a discharge pipe 12. The pump is driven by a substantially constant impelling force, here shown as a motor 13 through shaft 14 and a flexible coupling 15.

The control mechanism of my invention which is common to all embodiments includes a differential gearing indicated generally at 16 and mounted on a shaft 17 having its bearings at 18 in standards 19. Two bevel gear wheels 20 and 20a are rotatably mounted on the shaft and to these wheels are secured sheaves 21 and 21a respectively. A second set of gears 22 and 22a are rotatably mounted on studs 23 in a differential carrier 24 and mesh with the gears 20 and 20a, respectively. The studs 23 are secured to the carrier 24 which is, in turn, secured to the shaft 17. The gears 22 and 22a are held in position by collars 25 secured on the studs 23, and the gearing is held in proper mesh by collars 26 and 26a secured to the shaft 17. The shaft 17 drives a stem 27 through a coupling 28, and this stem actuates a valve 29 controlling the admission of a diluent, such as water, from a pipe 30 to the supply pipe 11.

The shaft of the motor 13 is extended on the side remote from the pump and carries a pulley 31 which is connected to the pulley 21 by a belt 32. A motor 33 is operated at a substantially constant predetermined speed, and is connected to the pulley 21a by a belt 34. The motor 33 is provided with a speed regulating device which is manually operated to adjust the speed, so that it conforms to the speed of motor 13 when pump 10 is handling stock of the desired consistency.

In operation, assuming that the consistency of the material varies, then, since the difference in feed and discharge heads to and from the pump is constant, the pump motor will operate at a speed determined by the power necessary to overcome this difference in head when handling a material of a given consistency. The motor 33 having been set to run at a substantially fixed speed which is the same as the normal speed of the motor 13 when the fluent material is at the desired consistency, then, under normal conditions, motors 13 and 33 are operating at the same speed but in opposite directions, and the sheaves 21 and 21a and hence the gears 20 and 20a are rotating at the same speed and in opposite directions, with the result that the gears 22 and 22a are simply turning on the studs 23 without planetary rotation and without rotating the shaft 17.

When the consistency of the stock varies from the predetermined standard, corresponding to which the motor 33 is set to operate, there will result a variation in the speed of motor 13 relative to the speed of the control motor 33. That is to say, if the consistency of the stock changes, this will be immediately reflected by a corresponding change in the speed of motor 13 which will be above or below the speed of motor 33, as the case may be.

When motor 13 is running at greater speed than motor 33 the differential carrier 24 will be turned in one direction, and when it runs at lesser speed than motor 33 the carrier will be turned in the opposite direction. Since the carrier 24 is secured to the valve stem 27 this element will be turned to effect a corresponding closing or opening movement of the valve and thus increase or decrease the volume of diluent admitted to pipe 11. It will of course be understood that the sensitivity of the device may be governed by the selection of a pump motor having a suitable torque-speed characteristic and that the speed of the control motor 33 may be set by any of the common speed control means. As a practical matter, it may be desirable to select for the control motor one having a torque curve similar in shape to that of the pump motor, and to drive both motors from the same source of electric power; in other words, to have for the two motors similar regulation characteristics so that any change in power line conditions will exercise the same effect on both motors. By arranging the motors in this manner, no reasonable variation of power supply conditions will affect the consistency.

Hunting or oversensitivity may be avoided by a sufficiently great speed reduction between the motors and the gear set. The greater the speed reduction, the longer the interval of time between an indicated variation in consistency and its correction. The need for this character of adaptation arises particularly in cases where the measurement of the consistency may, in different applications of the device, take place at various distances from the point where dilution takes place, or the effect of dilution is slower in producing the desired results, or vice versa.

In the commercial application of the device, a manually operated clutch coupling 99 between the shaft 17 and the valve stem 27 is desirable in order that the valve opening may be set by hand and the speed of the two motors adjusted for the desired consistency. When the parts are thus adjusted, the shaft will be clutched to the valve stem, whereafter the regulator will maintain the desired consistency.

In the embodiment of my invention illustrated in Figs. 2 and 3, a beater is represented generally at 35. The slope of the surface of the stuff in a gravity type beater depends upon the consistency of the material. Two floats 36 and 37, spaced along the material in its direction of flow, by their difference in level, measure the consistency of the stuff. Flexible members 38 and 39, such as chains or ropes, are attached to the floats 36 and 37 respectively and pass over sheaves 40 and 41 to counterweights 42 and 43, respectively, the cable 38 also passing over an idler 401. The relative positions of the sheaves 40 and 41 is a measure of the consistency of the material. The difference in level between the two floats, rather than the absolute levels is, therefore, the determining factor.

In Fig. 3, I have illustrated a means by which the relative positions of the two sheaves, and therefore the measure of consistency of the stuff, may be caused to vary an electric current and thereby bring about the desired regulation of the stuff.

The interiorly threaded hubs 44 of the sheaves 40 and 41 engage threads on a shaft 45 supported in brackets 46. A resistor 47, which may comprise a plurality of carbon discs is mounted on shaft 45 between the sheaves 40 and 41. As the sheaves turn on the threaded portion of the shaft 45, they move to the right or to the left as the case may be. The pressure on this rheostat is obviously due to the difference in movement of the two sheaves. If they both move the same amount in the same direction, there will be no variation in pressure on the resistance. Any change in volume of the stuff in the beater will cause both floats to move vertically to the same extent and the sheaves to move the same amount and in the same direction, and merely shift the rheostat along the shaft or bar 45, but its electric resistance will not be affected. Any relative change in level, however, of the floats 36 and 37 due to a variation in the consistency of the material, will move the sheaves unequally and increase or reduce the resistance of the rheostat as the case may be.

In Fig. 4, I have shown a different form of variable rheostat 47' in which electrodes 49 and 50 are submerged in a fluent conducting material 51, and their distance apart varies the current in an electric circuit in accordance with variations in the consistency of the material. The electrodes 49 and 50 are connected by flexible members 381 and 391 to floats as shown in Fig. 2, the distance apart of the electrodes corresponding to the difference in level of the floats and thereby affording a measure of the consistency of the material. The electrodes 49 and 50 are connected to an electric circuit by conductors 52.

Fig. 5 illustrates a diagram of connections for the embodiment of my invention shown in Fig. 1. In this type the variations in the speed of motor 13 which drives the pump 10 are effected directly by variations in the consistency of the material being handled by the pump. The speed of motor 33 is adjusted by means of the rheostat 48' to conform to the normal speed of motor 13 when the stock is at the desired consistency, and hence the differential mechanism controlling the diluent valve is held stationary at normal consistency. Any variation in consistency, is immediately reflected in a speed differential between motors 13 and 33 which effects an opening or closing of the diluent valve and a correction of the consistency.

I have illustrated in Fig. 6 a diagram of connections for the arrangements illustrated in Figs. 2, 3 and 4 taken in connection with that shown in Fig. 7. In this case the motor 131 merely drives one side of the differential and is not connected to the pump. The speed of the motor 131 varies in accordance with the resistance of the rheostat 47 which in turn varies in accordance with the consistency of the material, as pointed out above. The motor 331 may be adjusted, by means of rheostat 48, to rotate at a desired predetermined speed conforming to the speed of motor 131 when the material is at standard consistency. The motors 131 and 331 operate differential 16 and thereby control the characteristic of the fluent material as above described.

While in the embodiment of my invention illustrated, I have shown a device for measuring and controlling the consistency of a fluent material such as paper pulp, it is to be understood that my invention is also applicable to the measurement and control of a characteristic other than consistency. For example, the characteristic that is to be measured and controlled may be density, turbidity, alkalinity, acidity, translucency or the like. Turbidity or color may be measured and controlled by a photo-electric cell, while density or viscosity may be measured and controlled by flow through an orifice, by differential floats, or by the resistance of a rotor whirled in the material. Furthermore, one characteristic may be used as a guide for the correction of another. For example, acidity may be difficult to measure, but it may cause a change in viscosity which is easy to measure. In that case the viscosity of the material would be measured and means provided for controlling the addition of the necessary amount of a neutralizing agent. The measured characteristic, therefore, is not necessarily the controlled characteristic of the material.

From the foregoing, many marked advantages of my invention are apparent. Among these may be noted the extremely simple method and means for setting the mechanism to maintain a desired consistency. All that is necessary is to regulate the speed of the control motor by means of a suitable rheostat which may, if desired, be equipped with a pointer and a dial calibrated in consistencies. Operating at normal consistency there is no load whatever upon my differential gearing and the maximum power which it is required to transmit is only that necessary to operate the valve. Hence, this element may be made very small and light. Another novel feature of considerable advantage resides in the utilization, as a characteristic measuring device, of a piece of equipment normally employed in the manipulation of the material. In the embodiment shown in Fig. 1 the pump 10, for example, may be any pump normally used in the processing for raising the material against a constant difference in head. No auxiliary equipment for measuring the consistency is necessary; and furthermore the consistency is determined from the whole mass of material rather than from a by-passed sample.

While I have described my invention in its preferred embodiment, it is to be understood that the words which I have used are words of description rather than of limitation and that the drawings are merely illustrative. Hence, changes within the purview of the appended claims may be made without departing from the true scope and spirit of my invention.

What I claim is:

1. The method of controlling a characteristic of a material of variable character which comprises moving an element at a speed varying in accordance with variations in the character of said material as effected by variations in said characteristics, moving a second element at a substantially constant predetermined speed and controlling the said characteristic of said material in accordance with variations in the relative speeds of said elements.

2. The method of controlling the consistency of fluent or plastic material having a variable character which comprises rotating an element at a speed varying in accordance with variations in the character of said material as effected by the consistency thereof, rotating a second element at substantially constant speed and controlling the consistency of said material in accordance with variations in the relative speeds of rotation of said elements.

3. The method of controlling the consistency of fluent or plastic material having a variable character which comprises moving an element in said material at a speed varying in accordance with variations in the consistency thereof, moving a second element at a substantially constant speed, and controlling the consistency of said material in accordance with variations in the relative speeds of said elements.

4. The method of controlling the consistency of fluent or plastic material having a variable character which comprises rotating an element at a speed varying in accordance with variations in the consistency of said material, rotating a second element at substantially constant speed, admitting a diluent to said material, and controlling the amount of diluent thus admitted in accordance with variations in the relative speeds of rotation of said elements.

5. In a device for controlling a characteristic of a material of variable character, a first element, means for moving said element at a speed varying in accordance with variations in the character of said material as effected by variations in said characteristic, a second element, means for moving said second element at a substantially constant predetermined speed, and means responsive to the relative speed of said elements for controlling the said characteristic.

6. In a device for controlling a characteristic of fluent material, a first rotatable element, means for rotating said element at a speed varying in accordance with variations in the character of said material as effected by variations in said characteristic, a second rotatable element, means for rotating said second element at a substantially constant predetermined speed, and means responsive to the relative speeds of said elements for correcting the said characteristic of said material.

7. In a device for controlling the consistency of fluent material, a differential gear, means responsive to variations in the consistency of said material for rotating a first element of said gear, means for rotating a second element of said gear at a substantially constant speed, means for admitting a diluent to said material, and means responsive to variations in the relative speeds of the two elements of said gear for controlling the amount of diluent admitted to said material.

8. In a device for controlling a characteristic of a material of variable character, the combination with a differential mechanism including two driven elements and an element rotatably responsive to differences in speed of the driven elements, of means for driving one of said driven elements at substantially constant predetermined speed, means for driving the other of said elements at a speed varying with variations in the characteristic to be controlled, and means operable by the element responsive to differences of speed of said driven elements for controlling said characteristic.

9. In a device for controlling a characteristic of a material of variable character, a first element, means for moving said element at a speed varying in accordance with variations in the character of said material as effected by variations in said characteristic, a second element, means for moving said second element, means for adjusting the rate of movement of said second element to conform to the rate of movement of said first element when said characteristic conforms to a prescribed standard and means responsive to the relative speed of said elements for controlling said characteristic.

10. In a device for controlling a characteristic of a material of variable character, a first element, means for rotating said element at a speed varying in accordance with variations in the character of said material as effected by variations in said characteristic, a second element, means for rotating said second element, means for adjusting the rate of rotation of said second element to conform to the rate of rotation of said first element when said characteristic conforms to a prescribed standard, and means responsive to the relative speed of said elements for controlling said characteristic.

11. In a device for controlling the consistency of fluent material, a pipe through which the said material flows, a pump for forcing the material therethrough, a differential gear, a motor operating said pump and actuating a first element of said gear, means for actuating a second element of said gear at a substantially constant speed, and means responsive to variations in the relative speeds of the two said elements of said differential gear for controlling the consistency of said material.

12. In a device for maintaining paper stock at a predetermined consistency, the combination with a stock pump, of a differential gear, a motor for driving said pump and one side of said gear at variable speeds depending upon the consistency of the stock, a second motor for driving the other side of said gear at a substantially constant predetermined speed, and means operated by said gear for controlling the quantity of water in the stock.

13. In a device for controlling the consistency of fluent material, a differential gear, a pipe through which the material flows, a pump interposed in said pipe for pumping the material, a motor operating said pump and actuating a first element of said differential gear, means for actuating a second element of said gear at a substantially constant speed, means for admitting a diluent to said material, and means operable in accordance with variations in the relative speeds of the two said elements of said gear for controlling the admission of the diluent.

14. In a device for controlling a characteristic of a material of variable character, the combination with means for determining variations in said characteristic, of a movable element, means for moving said element, means responsive to variations in said characteristic for varying the rate of movement of said element, and means controlled by variations in the rate of movement of said element for controlling said characteristic.

15. In a device for controlling a characteristic of a material of variable character, the combination with a movable element, of means for moving said element, said means being responsive to variations in said characteristic for controlling the rate of movement of said element, and means actuated by said first mentioned means when its rate of movement differs from a predetermined standard for controlling said characteristic.

16. In a device for controlling the consistency of fluent material, a first movable element, means for varying the rate of movement of said element in accordance with variations in the consistency of said material, a second element rotatable at a substantially constant speed, and means responsive to the relative speeds of said elements for controlling the consistency of said material.

17. In a device for controlling a characteristic of a fluent or plastic material a variation in which characteristic effects a variation in the fluency or plasticity of said material; the combination with a device normally employed for manipulating said material, of a motor for driving said device, a second motor, means for adjusting the speed of the second motor to a desired, substantially constant rate, and means responsive to variations in the relative speeds of said motors for controlling said characteristic.

18. In a device for controlling the consistency of paper stock, the combination with a means normally employed in the manipulation of said stock, of a motor for driving the same; a second motor, means for adjusting the speed of said second motor to a desired, substantially constant rate, and means responsive to variations in the relative speeds of said motors for controlling the consistency of the stock.

TANDY A. BRYSON.